April 8, 1958  A. WITTMOSER  2,829,407
METHOD AND APPARATUS FOR CONTINUOUS CASTING
OF SOCKET PIPES AND THE LIKE
Filed Jan. 18, 1954  2 Sheets-Sheet 1
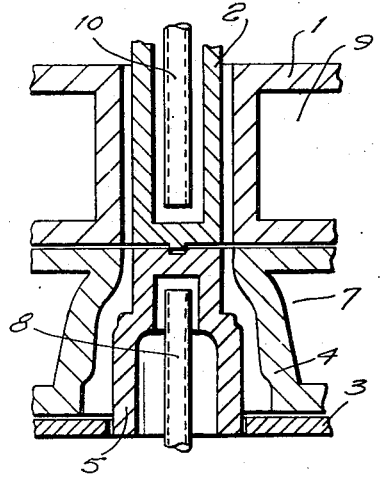
FIG.1.
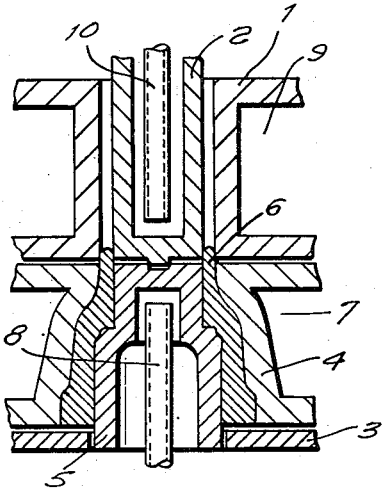
FIG.2.
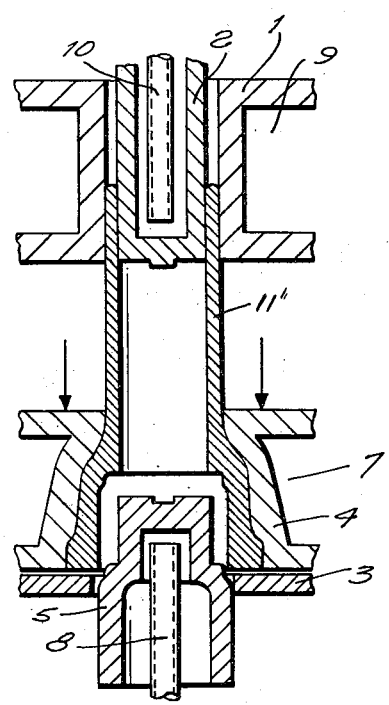
FIG.3.
FIG.4.
INVENTOR
ADALBERT WITTMOSER
BY

INVENTOR
ADALBERT WITTMOSER
BY

United States Patent Office 2,829,407
Patented Apr. 8, 1958

2,829,407

METHOD AND APPARATUS FOR CONTINUOUS CASTING OF SOCKET PIPES AND THE LIKE

Adalbert Wittmoser, Gelsenkirchen, Germany, assignor to Eisenwerke Gelsenkirchen, Gelsenkirchen, Germany Application January 18, 1954, Serial No. 404,679

5 Claims. (Cl. 22—57.2)

The present invention relates to continuous casting of tubular articles. More particularly, the present invention relates to an apparatus and a method for continuous casting of socket pipe and the like.

It is an object of the present invention to provide a method and an apparatus for continuous casting of pipe material of the above type wherein the socket portion of the pipe may be solidified as rapidly as possible while at the same time avoiding the shrinking of the pipe socket on the socket core of the mold.

Other objects and advantages will become apparent from the following description and the appended claims.

With the above objects in view, the present invention mainly consists in a method of continuously casting socket pipe and the like, comprising the steps of pouring cast material into the shaft mold portion of a pipe mold having axially separable shaft and socket mold portions, the socket mold portion including a core member and an outer member axially movable relative to each other, moving the outer and core members of the socket mold portion axially relative to and in a direction away from each other when the core-facing surface of the cast material in the socket mold portion has solidified, and moving at a time after the start of movement of the socket mold members relative to each other at least the outer member of the socket mold portion and the shaft mold portion axially relative to and in a direction away from each other while pouring cast material into the shaft mold portion.

The present invention also relates to an apparatus for continuous casting of socket pipe and the like, comprising, in combination, a shaft mold portion comprising outer and core portions defining an elongated annular mold space between the outer surface of the core portion and the inner surface of the outer portion, an outer socket mold member of larger inner diameter than the outer portion of the shaft mold portion and axially aligned therewith, the outer socket member being axially movable away from the outer portion of the shaft mold portion, and a core member arranged within the outer socket member defining an annular socket mold space between itself and the inner surface of the outer socket member, the outer and the core members being axially movable away from each other.

In accordance with another form of the invention, the outer socket mold portion is made integral with the outer shaft mold portion, and in this form the socket core member is likewise made axially movable away from the rest of the mold structure, so that the socket core member may be removed from its position within the outer socket portion after the core-facing surface of the cast material in the socket mold portion has solidified. In this form, a support member arranged at the socket end of the mold device for holding the cast material in the mold device is made axially movable in the same direction as the socket core member so as to provide for continuous casting of the pipe, in the manner more fully described below.

In accordance with the invention the outer member of the socket mold portion is preferably artificially cooled, and the socket core member is preferably composed of metal and likewise artificially cooled. In the process of the present invention, the socket core member and outer member may be moved relative to and independent of one another at different speeds while the continuous casting process is carried on, i. e., while the cast material is being poured into the shaft mold portion of the mold. Further, in accordance with the invention, the outer member of the socket mold portion may be moved axially relative to the shaft mold portion, either before or after the socket core member is moved relative to the outer socket member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional view in elevation of a continuous casting apparatus constructed in accordance with the present invention before cast material is introduced therein;

Fig. 2 shows the apparatus of Fig. 1 after the pouring of the cast material has begun;

Fig. 3 shows the arrangement of the parts of the apparatus of the preceding figures after solidification of the inner surface of the socket;

Fig. 4 shows the arrangement of the parts of the apparatus after the actual continuous casting process has begun;

Figure 5:
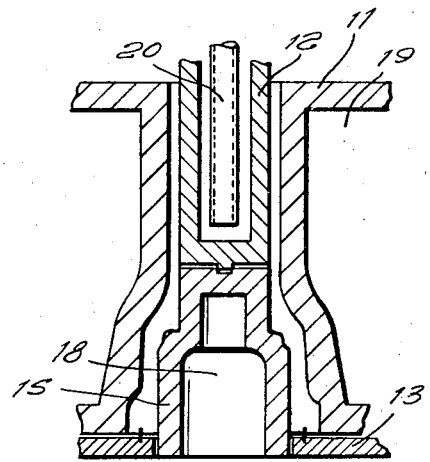
Fig. 5 is a sectional view similar to that of Fig. 1 showing another embodiment of the present invention.
Figure 6:
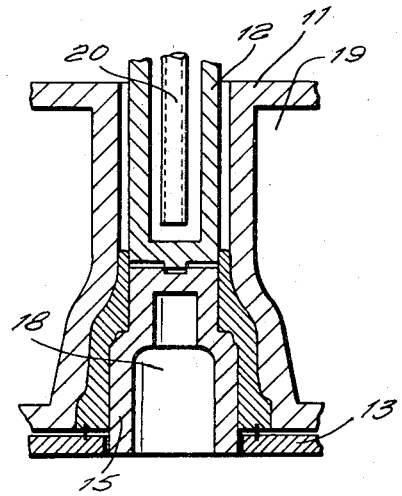
Fig. 6 shows the apparatus of Fig. 5 after the pouring of the cast material has begun.

Referring now to the drawing, and particularly to Fig. 1, there is shown a cast iron mold having a stationary outer shaft mold portion 1 in which a stationary core bar 2 is arranged, outer portion 1 being provided with water cooling conduit 9 and core bar 2 having a water cooling conduit 10. A supporting platform 3 is arranged below the shaft mold portions 1 and 2 movably carrying an outer socket mold member 4 which is arranged, as shown in Fig. 1, in contact with stationary shaft mold portion 1 at the beginning of the casting operation, mold member 4 having a cooling conduit 7 arranged therein.

A socket core member 5 is arranged within mold member 4 having cooling conduit 8 and being arranged at the beginning of the casting process in engagement with core bar 2 of the stationary portion of the mold apparatus, the two core portions 2 and 5 being at this stage centered and in engagement with each other.

Fig. 2 shows the parts of the apparatus in the same relative positions as in Fig. 1 after cast material 6 has been poured into the mold space formed by the respective outer and core members. The parts of the apparatus are allowed to remain in this position until at least the inner surface of the socket formed by material 6 has become solidified.

After such solidification of the inner socket surface, the socket core member 5 is drawn out in the direction of the axis of the mold apparatus from the interior of outer socket member 4 until it is free from the inner surface of the socket formed by material 6, as shown in Fig. 3.

Then, the outer socket member 4 is moved axially away from the stationary mold portions 1 and 2, this movement being produced by lowering of supporting platform 3 which carries outer socket member 4. During this axial movement of socket member 4, the continuous casting process is carried on so that there is formed an elongated shaft portion 11' of the socket pipe, as shown in Fig. 4.

The mechanical apparatus by means of which the periodic independent movement of the socket core member and of the outer socket member relative to each other at different speeds is accomplished is not shown in the drawing. Such apparatus can be of various known types as desired.

In the embodiment of the invention as above described, the socket core member 5 is first moved alone out of the socket formed by the cast material solidifying within the socket mold portion, and the axial movement of the outer socket mold member 4, and thereby the initiation of the actual continuous casting process, is not begun until the socket core member has been disengaged from the inner surface of the socket.

In those cases in which, for example, due to a small cross-section or small wall-thickness of the tube or hollow body to be produced, the solidification of the cast material has set in prematurely in the cylindrical tube portion, so that to avoid the danger of shrinkage of this part on the stationary core bar, which may be water cooled, the actual continuous casting process must be initiated before the solidification of the socket portion, the process in accordance with the present invention may be so carried out that the outer socket mold member 4 and the socket core 5 may, in the beginning, be moved together at the same speed in the direction of the mold axis away from the stationary mold portion until the socket outer and inner surfaces are solidified, and then the core socket 5 may be moved more rapidly than the outer core member 4 until the socket core 5 is released from the inner surface of the socket. Then the two parts 4 and 5 may again be moved at the same speed.

Figure 7:
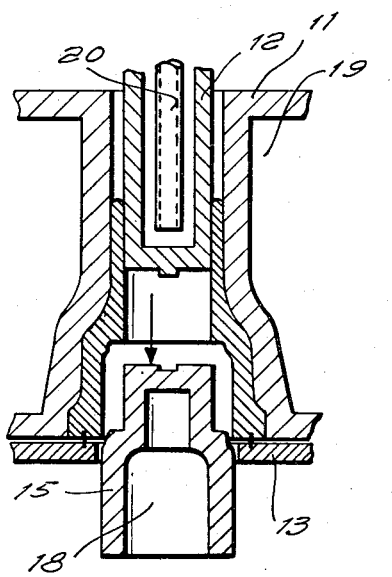
Fig. 7 shows the arrangement of the parts of the Fig. 5 apparatus after solidification of the inner surface of the socket.
Figure 8:
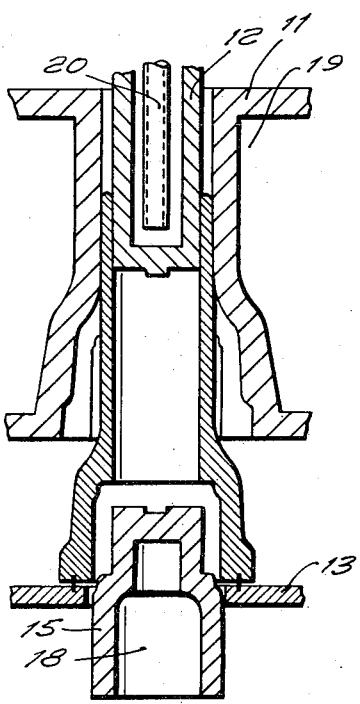
Fig. 8 shows the arrangement of the Fig. 5 apparatus after the actual continuous casting process has begun.

In the form of device shown in Figs. 5-8, the mold device according to the invention is formed of a single outer mold member 11, in contrast to the above described arrangement wherein the outer portion of the mold is composed of two parts axially separable from each other. In the form of device shown in Figs. 5-8, which includes cooling conduits 19 and 20, shaft core 12, and axially movable support 13, the socket core member 15 is first moved axially out of outer member 11, as shown in Fig. 7, after the pipe socket or the core-facing surface thereof has solidified, while the outer socket portion of member 11 remains in its original position. It is, of course, possible to provide for actual movement of the mold member 11 relative to socket core member 15, instead of moving the latter member. Then, after the shaft portion of the pipe has solidified in the shaft mold portions, the supporting member 13, which serves to hold the cast material within the mold device, is moved axially along with socket core member 15 relative to mold member 11, as shown in Fig. 8, while cast material is continuously poured into the top of the mold device, thereby providing for continuous formation of the shaft portion of the pipe.

The socket core member 15, as shown in the drawings, need not be provided with special cooling means of the type above described and shown by conduit 19 and 20 in the main portion of the mold device, core member 15 in this form merely being of hollow shape to reduce its heat-absorbing mass, as indicated by hollow portion 18.

In producing socket pipe or the like having irregular inner surfaces, as, for example, in the manufacture of socket pipe which is provided with an inner threaded portion, the axial movement of the socket core member with respect to the outer socket mold member can be obtained, of course, by corresponding simultaneous turning of the socket core member about its axis. Furthermore, the present invention is not restricted only to the manufacture of socket pipe, but rather encompasses the manufacture, in a manner similar to that above described, of other hollow bodies, as, for example, such bodies having unequal inner diameters, and in such cases movable outer mold portions and movable core portions are used in a manner similar to that as above described.

The present invention will find particular use in casting operations where a solidification of the socket portions of pipe produced in continuously cast tubes is desired to be obtained as rapidly as possible, while at the same time avoiding the shrinking of the socket portion of the solidifying pipe on the core mold member.

It will be understood that each of the elements described above, or two or more together, may also find a useful application in other types of mold devices differing from the types described above.

While the invention has been illustrated and described as embodied in a socket pipe mold, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for continuously molding a tubular member comprising, in combination, outer tubular mold means having a substantially vertical axis when in an operating position; a support member engaging the bottom surface of said outer mold means, said support member being formed with an opening coaxial with said outer mold means; and inner mold means coaxial with said outer mold means and located within and spaced from the latter, said inner mold means including an upper core portion and a bottom core portion which is axially movable with respect to said upper core portion, said outer mold means and said support member through the opening of the latter, said bottom core portion having a top part of the same cross section as said upper core portion and a lower enlarged part, and said bottom core portion being hollow and having a closed top end and an open bottom end.

2. A process for continuously molding a tubular member having a length greater than that of the mold, comprising the steps of pouring molten material into a mold member located over a support member; shifting an inner core portion of the mold axially away from the inner surface of the tubular member being molded and downwardly through a part of the support member after said inner surface has solidified sufficiently to retain its own shape; and then moving said support member and inner core portion together axially away from a stationary part of the mold until said tubular member has a desired length.

3. A process for continuously molding a tubular member having a length greater than that of the mold, comprising the steps of pouring molten material into a mold member located over a support member; shifting an inner core portion of the mold axially away from the inner surface of the tubular member being molded and downwardly through a part of the support member after said inner surface has solidified sufficiently to retain its own shape; and then moving said support member and inner core portion together with an outer mold part axially away from a stationary mold part until the tubular member has a desired length.

4. A process for continuously molding a tubular member having a length greater than that of the mold, comprising the steps of pouring molten material into a mold member located over a support member; shifting an inner core portion of the mold together with said support member axially away from a stationary part of the mold; and then while said support member continues to move shifting said inner core portion in the same direction as said support member but at a faster rate through a part of said support member until said inner core portion is separated from the inner surface of the tubular member being molded.

5. A process for continuously molding a tubular member having a length greater than that of the mold, comprising the steps of pouring molten material into a mold member located over a support member; moving one of said members away from the other of said members along the axis of the tubular member being molded; and shifting an inner core portion of the mold axially away from the inner surface of the tubular member being molded downwardly through a part of the support member after said inner surface has solidified sufficiently to retain its own shape and while the molding of the tubular member is still under way.

References Cited in the file of this patent

UNITED STATES PATENTS

| | | |
|---|---|---|
| 550,089 | Armand et al. | Nov. 19, 1895 |
| 1,158,921 | Hewitt | Nov. 2, 1915 |
| 2,367,123 | Hopkins | Jan. 9, 1945 |

FOREIGN PATENTS

| | | |
|---|---|---|
| 877,940 | Germany | May 28, 1953 |